(12) United States Patent
Hennen et al.

(10) Patent No.: US 7,286,567 B1
(45) Date of Patent: Oct. 23, 2007

(54) TELECOMMUNICATIONS SYSTEM, AND METHODS FOR TRANSMITTING DATA, AND TELECOMMUNICATION SYSTEM SYNCHRONIZATION METHOD

(75) Inventors: Stefan Hennen, Gauting (DE); Annette Roder, München (DE); Klemens Skorka, München (DE); Klaus Steinigke, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/786,063

(22) PCT Filed: Aug. 26, 1999

(86) PCT No.: PCT/EP99/06286

§ 371 (c)(1),
(2), (4) Date: Jul. 10, 2001

(87) PCT Pub. No.: WO00/13354

PCT Pub. Date: Mar. 9, 2000

(30) Foreign Application Priority Data

Aug. 28, 1998 (EP) ................... 98116319

(51) Int. Cl.
*H04J 3/06* (2006.01)
(52) U.S. Cl. ............... 370/509; 398/154; 370/516
(58) Field of Classification Search ............ None
See application file for complete search history.

(56) References Cited

U.S. PATENT DOCUMENTS 5,706,291 A * 1/1998 Kainulainen et al. ....... 370/503
5,886,996 A * 3/1999 Wolf ........................ 370/507
6,041,066 A * 3/2000 Meki et al. ................ 370/512
6,163,551 A * 12/2000 Wolf ........................ 370/503
6,185,247 B1 * 2/2001 Williams et al. ........... 375/212
6,240,106 B1 * 5/2001 Slater ....................... 370/517
6,262,996 B1 * 7/2001 Kainulainen et al. ....... 370/503
6,307,869 B1 * 10/2001 Pawelski ................... 370/516
6,310,895 B1 * 10/2001 Lundh et al. .............. 370/503

FOREIGN PATENT DOCUMENTS

EP 0 522 748 A2 1/1993

OTHER PUBLICATIONS

XP-000685831 Network Synchronization Aspects pp. 31-37.

* cited by examiner

*Primary Examiner*—Bob A. Phunkulh
(74) *Attorney, Agent, or Firm*—Bell, Boyd & Lloyd LLP

(57) ABSTRACT

Telecommunications systems can be synchronized via the transmission link. In this process, the telecommunication systems receive the clock signal and an additional information item, which describes the quality of the clock signal, from the received data stream. In telecommunication systems which are connected to a number of differently standardized transmission networks, different algorithms for evaluating the differently formatted clock signal quality data are necessary in the main processor. The present telecommunications system simplifies the communication of clock signal qualities. The different interface cards have converters which convert the clock signal quality information between a transmission-network-specific format and an independent format. The main processor only contains a subunit for processing all clock signal qualities. The present method for synchronizing a telecommunication system includes a converting the transmission-network-specific data into messages of an independent format. The present method for transmitting data includes converting the independently formatted messages into transmission-network-specific data.

27 Claims, 2 Drawing Sheets

TELECOMMUNICATIONS SYSTEM, AND METHODS FOR TRANSMITTING DATA, AND TELECOMMUNICATION SYSTEM SYNCHRONIZATION METHOD

BACKGROUND OF THE INVENTION

1. Field of the Invention

The present invention relates to a method for synchronizing a telecommunication system, and to a telecommunication system and method for transmitting data from telecommunication system into at least one transmission network. In particular, the present invention relates to telecommunications systems which are used for transmitting data via a multiplicity of various transmission networks.

2. Description of the Prior Art

The term "telecommunication" is a generic term for all communication transmission methods via which various services in long-distance man-man, man-machine and machine-machine communication. Telecommunication is attaining a very special significance due to the growing-together of information technology and communication technology. Telecommunication is characterized by the transmission technology involving cable transmission technology, radio voice and data transmission, satellite technology, optical fiber technology, modems, digital switching systems and switching technology and local area networks.

To provide for a meaningful exchange of messages between two (or more) parties requires, in addition to the pure transmission of messages, a rule system which defines the conventions to be adhered to for meaningful communication in the form of protocols. Such rules are described, for example, in the service specifications of the individual layers of the OSI (open systems interconnection) Reference Model. The OSI Reference Model was created by the International Standardization Organization (ISO) in 1983 on the basis of the transmission of information in the field of data processing and is now also very widely used in applications of the communication systems. The OSI Model only represents principles of information transmission and, in consequence, only defines the logic of the information flow between subscribers. Since the OSI standard does not contain any specifications on the physical transmission of communication, it is manufacturer-independent but needs supplementary protocols for more detailed specification on the basis of other, e.g. proprietary standards, to implement a communication system.

In principle, a distinction can be made between asynchronous and synchronous communication. Asynchronous communication generally refers to the exchange of messages between a transmitting and a receiving entity which is completely decoupled in time. The time when a transmitting and its associated receiving operation is initiated cannot be predicted.

By comparison, synchronous communication refers to the exchange of messages between a transmitting and a receiving entity if this exchange occurs within a fixed timing pattern. In this context, a transmitting and its associated receiving operation always must be executed at the same time.

Telecommunication networks are characterized by the possibility of bidirectional and multidirectional data exchange between the subscribers. This presupposes that each subscriber involved can communicate with any other subscriber via the same medium. The simplest implementation of this is the communication of all subscribers in baseband. Due to the multiplicity of parallel active subscribers, methods are predominantly used which statically allocate the available bandwidth to the subscribers in time-division multiplex. Due to the increasing utilization of optical fiber technology, the necessity of improved intercontinental data communication and the increased performance requirements, the plesiochronous digital hierarchy (PDH), which has been prevailing since the 60s, is increasingly replaced by the synchronous digital hierarchy (SDH).

In the plesiochronous digital hierarchy, the data of various terminal systems present in PCM (pulse code modulation) are multiplexed bit by bit into a data stream. A hierarchical level is characterized by the number of basic channels multiplexed by it or, respectively, of the frames of the next lower hierarchical level.

Due to the difference in transmission rate of a basic channel in Europe and in the U.S., incompatible PDH hierarchies were formed. The DS1 standard prevailing in the U.S. provides for three hierarchical levels whereas five levels are provided in the European E1 standard. The lowest level (E1) multiplexes 30 basic channels. Due to the plesiochronous transmission in which deviations of $(2-5)10^{-2}$ Hz from the nominal clock rate are permissible, the nominal transmission rates do not exactly correspond to a multiple of the next lower level but are slightly higher. The gap within a hierarchical level which thus occurs due to the permissible fluctuations is solved by stopping bits which do not contain any information (positive stopping).

Although optical fibers are also used as transmission medium for the higher PDH levels, the increase use of optical fibers led to considerations with regard to a new more powerful approach which was intended to replace the obsolete PDH technology even back in the 80s.

The development in the U.S. was initiated by the Bellcore company and taken over by the Industrial Carriers Compatibility Forum (ICCF) in 1984. The American SONET (Synchronous Optical Network) standard emerging from this resulted in the international or SDH (Synchronous Digital Hierarchy) standard issued by the International Telecommunications Union (ITU).

SONET is the standard issued by the CCITT for a family of interfaces for use in optical networks, the transmission medium of which is an optical fiber. SONET, thus, for the first time enables terminals from various manufacturers to be connected in standardized form and optical multiplexes with digital cross connects to be directly connected. In these arrangements, data rates of 51.84 Mb/s to over 2.4 Gb/s are achieved.

The synchronous digital hierarchy (SDH) is occasionally also called the international variant of SONET. The basic format of the SDH transmission is the STM-1 (synchronous transport module) frame. The STM-1 frame is composed of a header, with supplementary section information and a user data section, the container. Common to the STM frames also of all higher hierarchical levels is a fixed transmission time. Since the SDH standard is compatible with the SONET standard above a transmission rate of 155 Mb/s, SDH provides for simpler intercontinental data communication compared with PDH. Due to the lower overhead in comparison with the payload, SDH is also distinguished by very good efficiency of over 96%.

As a rule, telecommunication systems which are connected to standardized transmission networks such as PDH, SDH or SONET require synchronization in order to achieve the necessary clock accuracy at the interface to the transmission network. In this context, a distinction is made between two modes of synchronization. In the case of external synchronization, the system is supplied directly with a clock from an external synchronization source. In synchronization via the transmission link, by comparison, the clock is obtained from the received data stream of the interface and supplied as synchronization source to the system. For this purpose, the received data frames also contain, among other things, supplementary information describing the quality of the clock signal of a distant station in addition to the user information.

In some of the interface types in plesiochronous digital hierarchy, the clock signal quality is transmitted in the timing marker bit. Table 1 shows the timing marker bit MA byte according to PDH (ITU G.832, E3).

In the case of SONET and the synchronous digital hierarchy SDH, the quality of the clock signal is communicated in the so-called SSM (synchronization status message) byte. Table 2 shows the SSM definition in SONET (Bellcore GR253) and Table 3 shows the SSM definition in the synchronous digital hierarchy (ITU G.708).

Since different standardized transmission networks such as PDH, SDH or SONET exist in parallel, there is a need for telecommunication systems which maintain connections to a number of these transmission networks at the same time. FIG. 2 shows such a telecommunication system which includes a main processor MP 2 and interface cards 4-10. Such a telecommunication system has a separate interface card for each different interface type. The telecommunication system also types a synchronization system 12 which is connected both to the main processor 2 and the interface cards.

As shown in FIG. 2 under reference symbol 14, the interface cards 4-10 communicate the respective clock signal qualities to the main processor 2. In addition, the interface cards, as shown under reference symbol 16, supply the clock obtained from the transmission network in each case to the synchronization system 12. The synchronization system synchronizes the telecommunication system with a clock 16 transmitted from the interface cards under control by the main processor 2 via connections 17.

On the basis of the clock signal qualities received from the interface cards 4-10 via the connections 14, the main processor 2 assesses with which one of the clock signals supplied from the standardized transmission networks the telecommunication system is to be synchronized. Since, as stated above and as can be seen from tables 1 to 3, the clock signal quality information items provided by the different interface types are present in different formats and even have different value ranges, the clock signal qualities from different interface types must be treated separately in the main processor 2. For this purpose, the main processor has subunits 20, each one of which is provided for processing the clock signal quality information items of one interface type (PDH, SDH, SONET). These different subunits 20 of the main processor 2 in each case have a different structure and in each case have different functionalities due to the different data formats. As such, the clock signal qualities are treated separately in the main processor. Different treatment is also evident from the current draft of ITU-T, G.synce, 01/98 (synchronization layer functions). This draft distinguishes between options 1 to 3, options 1 and 3 describing the synchronous digital hierarchy according to the previous ITU standard whereas option 2 relates to the SONET based on Bellcore.

Telecommunication systems of the aforementioned design have a disadvantage that a number of algorithms for the value ranges and formats inherent in the different transmission networks are necessary in the main processor. Owing to the different standards in existence, which also can differ in various countries, an adaptation of the main processor is therefore always necessary.

The present invention is, thus, directed to a telecommunication system of the abovementioned type, a method for synchronizing such a telecommunication system, and a method for transmitting data from such a telecommunication system, in which the communication of clock signal qualities is simplified.

SUMMARY OF THE INVENTION

Advantageous embodiments of the invention are the subject matters of claims 2 to 9, 11 to 19 and 21 to 27.

Accordingly, the present invention teaches that the clock signal quality is processed in accordance with only one algorithm in the system. Differentiation between the interface type is no longer required.

Avoiding separate treatments of clock signal qualities from different transmission networks results in a simplification of the internal communication in the system, especially during transmission, since the main processor 2 of a telecommunication system according to the present invention only generates one value of the clock signal quality and forwards it to all interface cards connected. This dispenses with the generation of different data formats in the main processor. This is associated with a reduction in the hardware and software expenditure in the main processor.

Furthermore, the number of messages to be sent is advantageously reduced and the performance of the system is enhanced.

A further advantage results from the simplified upgradability of the telecommunication system when a new transmission network standard is introduced since the main processor does not contain any standard-dependent elements.

Furthermore, the present invention advantageously creates a telecommunication system which, when data is converted into a format which is independent of the formats of the transmission networks, selects a value range of the independent format which covers all specific formats. This prevents a loss of information with respect to the clock signal quality of individual transmission networks.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
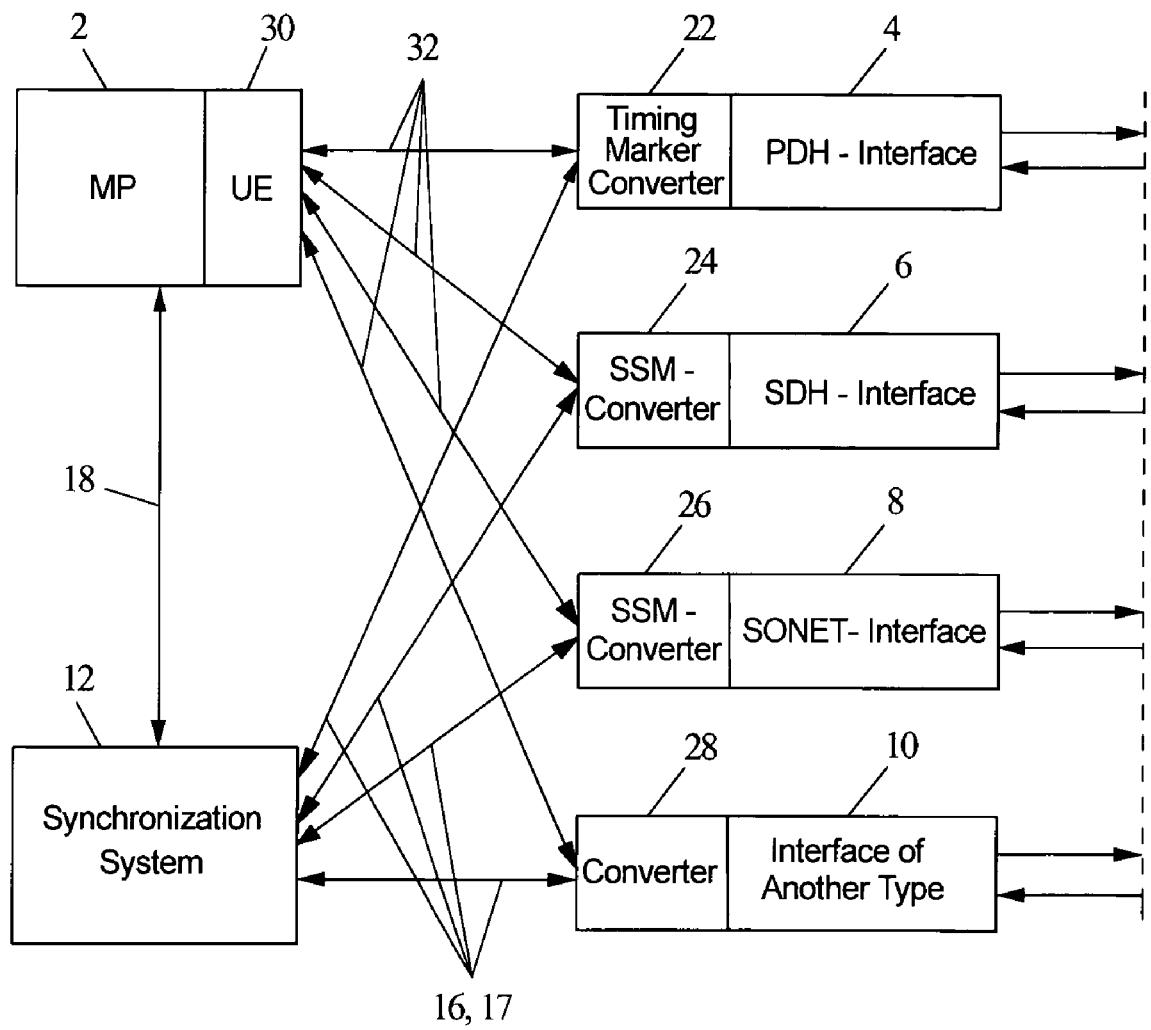
FIG. 1 shows a preferred exemplary embodiment of a telecommunication system according to the teachings of the present invention.
Figure 2:
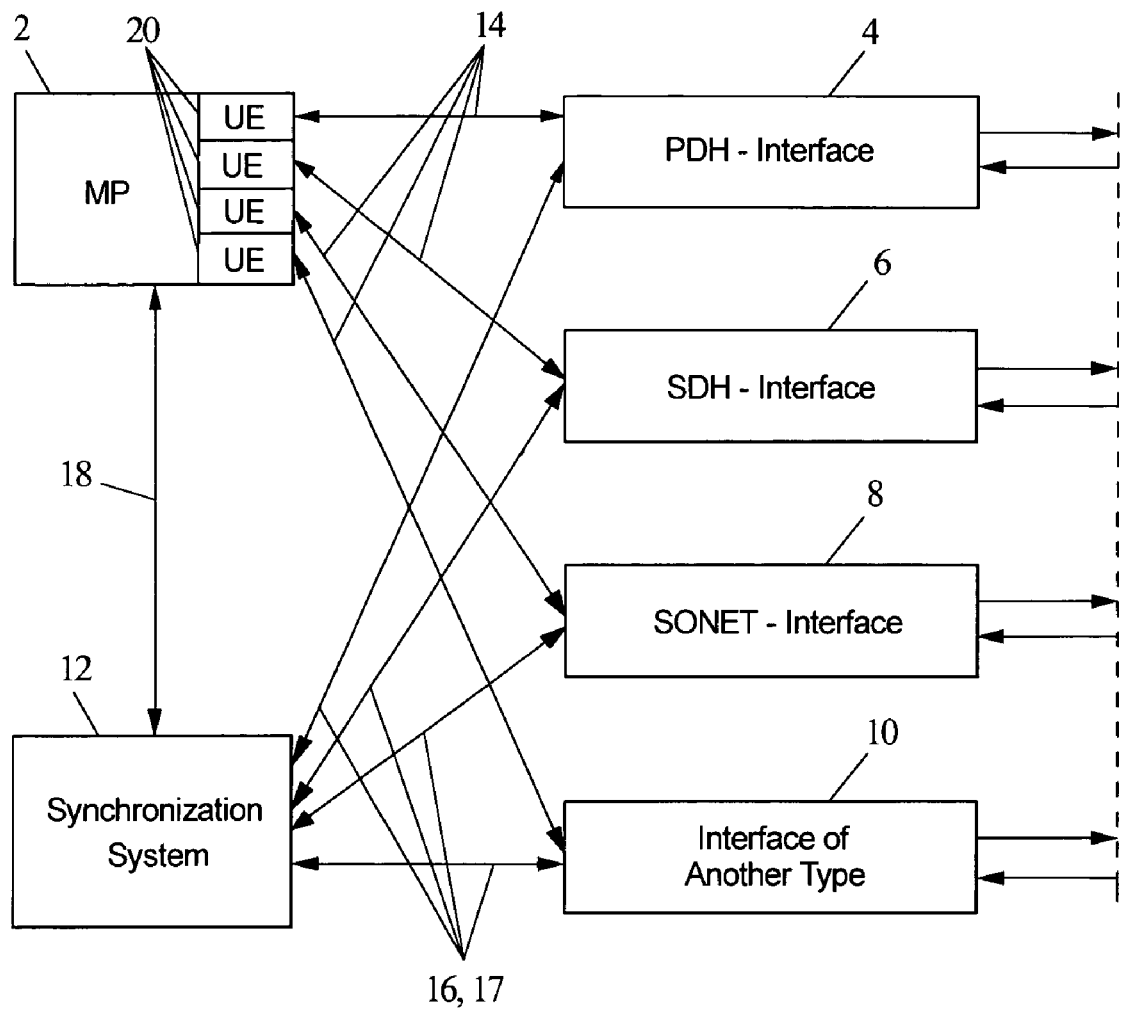
FIG. 2 shows a conventional telecommunication system.

FIG. 1 shows a preferred exemplary embodiment of a telecommunication system which, like the known telecommunication system described above, includes a main processor 2, a number of interface cards 4-10 and a synchronization system 12. In addition, the interface cards 4-10 have converters 22-28 which convert the interface-specific clock signal qualities into a uniform format. For example, the timing marker converter 22 converts the information on the clock signal quality of the PDH transmission network, contained in the timing marker bit, into the uniform format. The SSM converters 24, 26 of the SDH interface card 6 and the SONET interface card 8 convert the quality information items shown in tables 2 and 3, contained in the SSM data, into the uniform format. These uniformly formatted clock signal qualities are transmitted to the main processor 2 as shown at reference symbol 32. The main processor 2 has a common subunit 30 which receives the uniformly formatted clock signal qualities of all interface cards, processes them by using a single common algorithm and forwards them to the main processor for processing.

When data is transmitted from the telecommunication system to one or more transmission networks, the common subunit 30 of the main processor 2 transmits the current clock signal quality in the uniform data format via the connections 32 to the converters 22-28 of the interface cards 4-10. The converters convert the received clock signal quality into the corresponding data format of the respective transmission network, shown in tables 1 to 3, so that the data to be transmitted can be transmitted to the distant station by the respective interface card 4-10.

According to a preferred embodiment of the present invention, the uniform format of the clock signal qualities has a value range which exhibits at least the extent of the largest value range of the transmission networks connected. The clock signal quality is preferably stored in four bits of a byte.

Although the present invention has been described with reference to specific embodiments, those of skill in the art will recognize that changes may be made thereto without departing from the spirit and scope of the invention as set forth in the hereafter appended claims.

TABLE 1

| Description | Timing marker bit (MA byte) |
| --- | --- |
| Primary reference clock | 0 |
| Unknown | 1 |

TABLE 2

| Description | SSM-Z1-byte Bits 8-5 | DS1-ESF data connection code word |
| --- | --- | --- |
| Primary reference clock | 1000 | 00000100 11111111 |
| Normal, unknown quality | 0000 | 00001000 11111111 |
| Layer 2 hold over | 1110 | 00001100 11111111 |
| Layer 3 hold over | 0101 | 00010000 11111111 |
| SONET self-timed | 0011 | 00100010 11111111 |
| Layer 4 free running | N/A | 00101000 11111111 |
| Unsuitable for synchronization | 1111 | 00110000 11111111 |

TABLE 3

| Description | SSM-S1 byte, bits 5-8 |
| --- | --- |
| G.811 | 0010 |
| Synchronization network exists, quality unknown | 0000 |
| G.812 Transit node | 0100 |
| G.812 Local node | 1000 |
| SDH SETS | 1011 |

TABLE 3-continued

| Description | SSM-S1 byte, bits 5-8 |
| --- | --- |
| Unsuitable for synchronization | 1111 |

We claim:

1. A telecommunication system for transmitting data via at least one of a plurality of different transmission networks, the telecommunication system being supplied with a respective clock signal as synchronization source from the at least one transmission network, the telecommunication system comprising:
   at least one interface unit for receiving data from the at least one transmission network, the data describing a quality of the clock signal supplied via the at least one transmission network;
   a device for assessing the quality of the at least one clock signal; and
   a converter in the at least one interface unit which converts the data describing the quality of the clock signal into respective messages, the format of the messages being independent of a format of the data transmitted, and which transmits the messages to the device for assessment.

2. A telecommunication system as claimed in claim 1, wherein the converter receives additional messages from the device and converts the additional messages into data of a format of the at least one transmission network.

3. A telecommunication system as claimed in claim 1, wherein the data contains both user data and supplementary data, the quality of the clock signal being described by the supplementary data.

4. A telecommunication system as claimed in claim 1, wherein the plurality of different transmission networks includes at least one PDH transmission network.

5. A telecommunication system as claimed in claim 1, wherein the plurality of different transmission networks includes at least one SDH transmission network.

6. A telecommunication system as claimed in claim 1, wherein the plurality of different transmission networks includes at least one SONET transmission network.

7. A telecommunication system as claimed in claim 1, wherein the messages for describing the quality contain numerical values within a value range.

8. A telecommunication system as claimed in claim 7, wherein the value range is at least as wide as a largest value range of the data transmitted.

9. A telecommunication system as claimed in claim 7, wherein the value range includes four bits of a byte.

10. A method for operating a telecommunication system which is connected to at least one of a plurality of different transmission networks, the telecommunication system being supplied with a respective clock signal from the at least one transmission network as a synchronization source, the method comprising the steps of:
   receiving data, from the at least one transmission network and in a format used in the at least one transmission network, which describes a quality of the clock signal supplied;
   converting the data into respective messages of a format which is independent of the format of the received data;
   assessing the quality of the clock signal by assessing the messages;

deciding whether the telecommunication system is to be synchronized with the clock signal; and synchronizing the telecommunication system with the clock signal if it is decided that the telecommunication system is to be synchronized with the clock signal.

11. A method for operating a telecommunication system as claimed in claim 10, wherein the step of receiving data includes the steps of receiving user data and of receiving supplementary data, the data describing the quality of the clock signal being the supplementary data.

12. A method for operating a telecommunication system as claimed in claim 10, wherein the data is data of a PDH transmission network.

13. A method for operating a telecommunication system as claimed in claim 10, wherein the data is data of an SDH transmission network.

14. A method for operating a telecommunication system as claimed in claim 10, wherein the data is data of a SONET transmission network.

15. A method for operating a telecommunication system as claimed in claim 10, wherein the step of converting the data into messages includes recalculating a value of the quality of the clock signal into a value of an independent value range.

16. A method for operating a telecommunication system as claimed in claim 15, wherein the step of recalculating is reversible without loss.

17. A method for operating a telecommunication system as claimed in claim 15, wherein the step of recalculating includes setting four bits of one byte.

18. A method for operating a telecommunication system as claimed in claim 10, wherein the step of deciding includes selecting a highest-quality clock signal.

19. A method for operating a telecommunication system as claimed in claim 10, wherein the step of deciding includes selecting a clock signal having a quality which is above a threshold value.

20. A method for transmitting data from a telecommunication system into at least one of a plurality of different transmission networks, the data describing a quality of a clock signal with which the telecommunication system is synchronized, the method comprising the steps of:

generating a message describing the quality in a format which is independent of formats of the data to be transmitted;

converting the messages into data of a format used in the at least one transmission network; and transmitting the data into the at least one transmission network.

21. A method for transmitting data from a telecommunication system into at least one of a plurality of different transmission networks as claimed in claim 20, wherein the data includes both user data and supplementary data, the data describing the quality of the clock signal being the supplementary data.

22. A method for transmitting data from a telecommunication system into at least one of a plurality of different transmission networks as claimed in claim 20, wherein the data is data of a PDH transmission network.

23. A method for transmitting data from a telecommunication system into at least one of a plurality of different transmission networks as claimed in claim 20, wherein the data is data of an SDH transmission network.

24. A method for transmitting data from a telecommunication system into at least one of a plurality of different transmission networks as claimed in claim 20, wherein the data is data of a SONET transmission network.

25. A method for transmitting data from a telecommunication system into at least one of a plurality of different transmission networks as claimed in claim 20, wherein the step of converting the messages into data includes recalculating the value of the quality of the clock signal into a value of an independent range.

26. A method for transmitting data from a telecommunication system into at least one of a plurality of different transmission networks as claimed in claim 25, wherein the step of recalculating is reversible without loss.

27. A method for transmitting data from a telecommunication system into at least one of a plurality of different transmission networks as claimed in claim 25, wherein the step of recalculating includes setting four bits of one byte.

* * * * *